US010173332B1

(12) United States Patent
Zhu et al.

(10) Patent No.: US 10,173,332 B1
(45) Date of Patent: Jan. 8, 2019

(54) PAIR OF SAFE PET NAIL CLIPPERS (71) Applicant: Suzhou Petmate Industry & Trade Co., Ltd., Suzhou (CN)

(72) Inventors: Haiyuan Zhu, Suzhou (CN); Xinggen Huang, Suzhou (CN)

(73) Assignee: SUZHOU PETMATE INDUSTRY & TRADE CO., LTD., Suzhou (CN)

(*) Notice: Subject to any disclaimer, the term of this patent is extended or adjusted under 35 U.S.C. 154(b) by 0 days.

(21) Appl. No.: 15/893,765

(22) Filed: Feb. 12, 2018

(30) Foreign Application Priority Data

Jul. 10, 2017 (CN) .......................... 2017 1 0555963

(51) Int. Cl.
*B26B 13/08* (2006.01)
*A01K 13/00* (2006.01)
*A01K 17/00* (2006.01)
*B26B 13/22* (2006.01)

(52) U.S. Cl.
CPC .............. *B26B 13/08* (2013.01); *A01K 13/00* (2013.01); *A01K 17/00* (2013.01); *B26B 13/22* (2013.01)

(58) Field of Classification Search
CPC ......... B26B 13/00; B26B 13/08; B26B 13/16; B26B 13/18; B26B 13/22; A45D 29/02; A01K 17/00; A01K 13/00
USPC ..... 30/28, 29, 119, 120, 234, 233, 254–262, 30/271
See application file for complete search history.

(56) References Cited

U.S. PATENT DOCUMENTS

| | | | | |
|---|---|---|---|---|
| 10,972 A | * | 5/1854 | Brown .................... | A41H 25/02 30/120 |
| 73,205 A | * | 1/1868 | Sloat ...................... | B26B 17/02 30/271 |
| 83,293 A | * | 10/1868 | Lytle ...................... | B26F 1/32 30/119 |
| 103,386 A | * | 5/1870 | Stow ...................... | A01G 3/02 30/271 |
| 106,705 A | * | 8/1870 | Marsters ................. | B26B 13/16 30/271 |
| 137,745 A | * | 4/1873 | Whitney .............. | A01G 25/023 30/119 |
| 139,983 A | * | 6/1873 | Van Hoosen .......... | A41H 25/02 30/120 |
| 149,556 A | * | 4/1874 | Wolff .................... | B26D 7/015 30/119 |
| 156,619 A | * | 11/1874 | Wolff .................... | A01G 25/023 30/119 |

(Continued)

FOREIGN PATENT DOCUMENTS

DE 3701005 C1 * 4/1988 ............. B26B 17/00

*Primary Examiner* — Jason Daniel Prone
(74) *Attorney, Agent, or Firm* — SZDC Law P.C.

(57) ABSTRACT

A pair of safe pet nail clippers includes a first handle and a second handle correspondingly disposed and pivotedly connected to each other. The first and second handles respectively include a blade portion and a handle portion. Blades of the blade portions of the first and second handles are provided in a concave shape. When the handle portions of the first and second handles are relatively opened to the maximum extent, an initial trimming hole is formed between the concave blades of the first and second handles. The first and second handles are provided therebetween with an adjustment mechanism for adjusting the relative opening of the handle portions of the first and second handles and the caliber of the initial trimming hole.

5 Claims, 13 Drawing Sheets

(56) References Cited

U.S. PATENT DOCUMENTS

| | | | | |
|---|---|---|---|---|
| 203,272 A * | 5/1878 | Hill | B21D 39/02 | 30/271 |
| 226,358 A * | 4/1880 | Schaffer | A41H 25/02 | 30/120 |
| 247,766 A * | 10/1881 | Korn | A41H 25/02 | 30/271 |
| 257,982 A * | 5/1882 | Schmidt | B67B 7/30 | 30/262 |
| 280,047 A * | 6/1883 | Kully | B23D 29/026 | 30/259 |
| 284,968 A * | 9/1883 | Lindsey | B26B 19/06 | 30/234 |
| 332,597 A * | 12/1885 | Donovan | B26B 13/04 | 30/271 |
| 340,053 A * | 4/1886 | Lytle | B26B 13/00 | 30/253 |
| 365,333 A * | 6/1887 | Dickenson | B23D 23/00 | 30/120 |
| 384,653 A * | 6/1888 | Vrooman | A41H 25/02 | 30/120 |
| 388,957 A * | 9/1888 | De Arment | B26B 17/02 | 30/271 |
| 389,925 A * | 9/1888 | Griscom | B66C 1/422 | 30/253 |
| 398,509 A * | 2/1889 | Henckels | A01G 3/02 | 30/271 |
| 414,528 A * | 11/1889 | Halbehann | A41H 25/02 | 30/120 |
| 419,489 A * | 1/1890 | Badger | A41H 25/02 | 30/120 |
| 427,245 A * | 5/1890 | Toof | A41H 25/02 | 30/120 |
| 442,005 A * | 12/1890 | Bartholomew | A01G 25/023 | 30/119 |
| 471,950 A * | 3/1892 | Carmody | B26B 13/06 | 30/119 |
| 492,452 A * | 2/1893 | Wright | A41H 25/02 | 30/120 |
| 547,101 A * | 10/1895 | Williams | B26B 17/02 | 30/271 |
| 559,383 A * | 5/1896 | Honaker | A01K 15/003 | 30/271 |
| 568,242 A * | 9/1896 | Fay | B26B 17/02 | 30/271 |
| 598,031 A * | 1/1898 | Steen | A41H 25/02 | 30/120 |
| 667,914 A * | 2/1901 | Klever, Jr. | B25B 7/22 | 30/120 |
| 673,014 A * | 4/1901 | Broadbooks | B26B 17/00 | 30/271 |
| 681,327 A * | 8/1901 | Klever, Jr. | A41H 25/02 | 30/120 |
| 690,925 A * | 1/1902 | Capewell | B26B 17/02 | 30/271 |
| 726,156 A * | 4/1903 | Goldsmith | A41H 25/02 | 30/120 |
| 863,111 A * | 8/1907 | Smohl | B26B 17/02 | 30/271 |
| 879,618 A * | 2/1908 | Flyberg | A41H 25/02 | 30/120 |
| 881,890 A * | 3/1908 | Barr | A41H 25/02 | 30/120 |
| 980,861 A * | 1/1911 | Blake | B26B 17/00 | 30/271 |
| 1,006,936 A * | 10/1911 | Guzman | A41H 25/02 | 30/120 |
| 1,011,053 A * | 12/1911 | Grizzle | A01K 15/003 | 30/271 |
| 1,034,947 A * | 8/1912 | Alvord et al. | A41H 25/02 | 30/120 |
| 1,062,829 A * | 5/1913 | Karsitz | A41H 25/02 | 30/120 |
| 1,065,741 A * | 6/1913 | Sparks | A41H 25/02 | 30/120 |
| 1,080,145 A * | 12/1913 | Friederick | A41H 25/02 | 30/120 |
| 1,107,210 A * | 8/1914 | Adams | H02G 1/1275 | 81/9.4 |
| 1,168,051 A * | 1/1916 | Bernard | B26B 17/00 | 30/271 |
| RE14,169 E * | 7/1916 | Aaron | | 30/271 |
| 1,205,999 A * | 11/1916 | Kirmsee | A41H 25/02 | 30/120 |
| 1,227,678 A * | 5/1917 | Scott | B23D 29/023 | 30/261 |
| 1,252,727 A * | 1/1918 | Sedlin | B26B 13/16 | 30/261 |
| 1,296,660 A * | 3/1919 | Hayden | B26B 13/22 | 30/271 |
| 1,331,851 A * | 2/1920 | Ouzoun-Boghossian | G04D 1/021 | 30/234 |
| 1,349,563 A * | 8/1920 | Day | B25B 7/18 | 30/271 |
| 1,552,495 A * | 9/1925 | Mohr | A01K 11/002 | 30/271 |
| 1,592,142 A * | 7/1926 | Laubscher | H02G 1/1229 | 30/90.6 |
| 1,602,451 A * | 10/1926 | Reardon | B26B 13/16 | 30/261 |
| 1,648,498 A * | 11/1927 | Morgan | B26B 13/04 | 30/260 |
| 1,822,591 A * | 9/1931 | Hickok | A01G 3/0251 | 30/271 |
| 1,880,951 A * | 10/1932 | Eyre | B26B 17/02 | 30/271 |
| 1,904,399 A * | 4/1933 | Balthaser | A61B 17/282 | 30/233 |
| 1,956,588 A * | 5/1934 | Parker et al. | B26B 13/04 | 30/260 |
| 2,181,056 A * | 11/1939 | Irvine | A01G 3/0475 | 30/261 |
| 2,480,797 A * | 8/1949 | Weber | A45D 29/02 | 30/29 |
| 2,491,712 A * | 12/1949 | Campbell | B26B 13/10 | 30/271 |
| 2,532,359 A * | 12/1950 | Drmic | A01G 3/02 | 30/258 |
| 2,624,114 A * | 1/1953 | Althausen | B26B 13/20 | 30/271 |
| 2,650,423 A * | 9/1953 | Phillips | B26B 13/16 | 30/271 |
| 2,708,311 A * | 5/1955 | McCloud | A41H 25/02 | 30/120 |
| 2,760,390 A * | 8/1956 | Ayer | H02G 1/1214 | 30/271 |
| 2,801,467 A * | 8/1957 | Casanovas | B23D 29/026 | 30/254 |
| 2,885,781 A * | 5/1959 | Bauer | B25B 7/22 | 30/254 |
| 2,910,900 A * | 11/1959 | Klein | H01R 43/042 | 30/193 |
| 2,929,141 A * | 3/1960 | Vosbikian et al. | A01G 3/0475 | 30/261 |
| 2,932,224 A * | 4/1960 | Peed, Jr. et al. | H02G 1/1214 | 30/91.2 |
| 3,096,581 A * | 7/1963 | Aapro | B23D 29/026 | 30/261 |
| 3,371,416 A * | 3/1968 | Horton | A01G 3/02 | 30/233 |
| 3,559,286 A * | 2/1971 | Pfaffenbach | A01G 3/02 | 30/261 |
| 3,832,771 A * | 9/1974 | Morgan | A45D 29/02 | 30/28 |
| 3,834,022 A * | 9/1974 | Students | B26B 13/16 | 30/261 |
| 3,854,202 A * | 12/1974 | Cortese | H02G 1/1214 | 30/91.2 |

(56) References Cited

U.S. PATENT DOCUMENTS

| | | | | |
|---|---|---|---|---|
| 3,972,333 | A * | 8/1976 | Leveen | A61B 17/30 30/234 |
| 4,584,770 | A * | 4/1986 | Sabol | B26B 13/285 30/230 |
| 4,744,147 | A * | 5/1988 | Modin | B26B 13/20 30/232 |
| 4,910,870 | A * | 3/1990 | Chang | B26B 17/02 30/242 |
| 5,220,856 | A * | 6/1993 | Eggert | B25B 7/06 30/254 |
| D337,247 | S * | 7/1993 | Dart | D8/52 |
| 5,319,854 | A * | 6/1994 | Pracht | B26B 13/28 30/254 |
| 5,498,095 | A * | 3/1996 | Krivec | B25B 7/06 30/261 |
| 5,499,454 | A * | 3/1996 | Compton | A41H 25/00 30/120 |
| 5,701,672 | A * | 12/1997 | Wachtel | A45D 29/02 30/28 |
| 5,749,147 | A * | 5/1998 | Hasegawa | B26B 13/06 30/254 |
| 5,890,295 | A * | 4/1999 | Wachtel | B26B 17/02 30/28 |
| 6,408,523 | B1 * | 6/2002 | Schmidt | B26B 13/28 30/254 |
| D472,127 | S * | 3/2003 | Willinger | D8/107 |
| 6,827,038 | B2 * | 12/2004 | Dunn | A01K 13/00 30/28 |
| 6,829,828 | B1 * | 12/2004 | Cech | A01G 3/02 30/250 |
| 6,915,575 | B2 * | 7/2005 | Cerutti | A45D 29/02 30/28 |
| 7,000,321 | B1 * | 2/2006 | Rodgers | A01K 13/00 30/29 |
| 7,124,669 | B1 * | 10/2006 | Rodgers | A01K 13/00 30/145 |
| 7,263,775 | B2 * | 9/2007 | Moulton, III | A01K 13/00 30/254 |
| 7,621,011 | B2 * | 11/2009 | Smith | A01K 17/00 30/28 |
| D615,254 | S * | 5/2010 | Manheimer, III | D30/158 |
| 8,051,572 | B2 * | 11/2011 | Zhang | B25B 7/02 30/252 |
| 8,074,361 | B2 * | 12/2011 | Bohlman | A01G 3/02 30/271 |
| 8,793,883 | B1 * | 8/2014 | Romero | A01D 46/247 30/261 |
| 9,003,667 | B2 * | 4/2015 | Huang | A01G 3/02 30/254 |
| 9,913,457 | B2 * | 3/2018 | Kim | A01K 17/00 |
| 2003/0024543 | A1 * | 2/2003 | Wolf | B26B 13/20 30/194 |
| 2006/0158871 | A1 * | 7/2006 | Hopkins | A01K 13/00 362/119 |
| 2007/0137041 | A1 * | 6/2007 | Manheimer | A01K 13/00 30/29 |
| 2007/0277378 | A1 * | 12/2007 | Kabella | A01K 13/00 30/29 |
| 2008/0271324 | A1 * | 11/2008 | Fryer | B26B 17/006 30/175 |
| 2009/0078278 | A1 * | 3/2009 | Tran | A45D 29/02 30/28 |
| 2009/0241342 | A1 * | 10/2009 | Habib | A45D 29/02 30/28 |
| 2011/0005537 | A1 * | 1/2011 | Hsu | A45D 29/02 30/28 |
| 2013/0219722 | A1 * | 8/2013 | Cordoba Sanchez | B26B 13/26 30/188 |
| 2014/0014042 | A1 * | 1/2014 | Bihlmaier | A01K 13/00 30/29 |
| 2014/0101944 | A1 * | 4/2014 | Moultrie | B26B 13/06 30/254 |
| 2014/0338201 | A1 * | 11/2014 | Romero | A01D 46/247 30/261 |
| 2015/0000139 | A1 * | 1/2015 | Boldt | A45D 29/02 30/28 |
| 2015/0101194 | A1 * | 4/2015 | Jui-Tsang | A01K 13/00 30/29 |
| 2016/0059427 | A1 * | 3/2016 | Stanley | A61B 17/8863 30/124 |
| 2016/0066542 | A1 * | 3/2016 | Kearns | A01K 17/00 30/29 |
| 2017/0013806 | A1 * | 1/2017 | Bihlmaier | A01K 13/00 |
| 2017/0245469 | A1 * | 8/2017 | Contreras | A01K 17/00 |

* cited by examiner

PAIR OF SAFE PET NAIL CLIPPERS

CROSS-REFERENCE TO RELATED PATENT APPLICATIONS

This application claims the priority benefit of China Patent Application No. 201710555963.1, filed on Jul. 10, 2017, which is incorporated by reference in its entirety.

TECHNICAL FIELD

The present invention relates to a pair of pet nail clippers.

BACKGROUND

With the improvement of people's living standard, pets have entered millions of households. The daily trimming of pets' nails is for not only beauty but also health of pets. Untrimmed nails may cause a variety of health problems. For example, long nails may break, ache and bleed. In extreme cases, nails may curl and grow into the pets' paws. Nails of pets, such as dogs or cats, grow quickly and have to be trimmed once or twice a month.

However, trimming pets' nails also bring some hidden dangers. With the root of a pet's nails rich in blood capillaries, it is generally not easy to judge how long to cut while trimming the pet's nails, and often only until the pet issues a cry or bleeds is the pet found to have been hurt. Besides, since a pair of pet nail clippers is different from that for human's nails and tends to be larger in size and more complicated in structure, a user may not be able to see parts of a pet's nails to be trimmed while trimming the pet's nails due to the blade or other structural portions of the pair of pet nail clippers blocking the line of sight of the user, which makes the pet more vulnerable.

SUMMARY

A purpose of the present invention is to provide a pair of safe pet nail clippers with a higher safety factor, in which the caliber of the initial trimming hole can be adjusted and controlled within a certain range by an adjustment mechanism according to the size of a pet's nails, so as to prevent the pet from being hurt due to excessive trimming and thus be safer to use.

A technical solution of the present invention is as follows: A pair of safe pet nail clippers is provided, comprising a first member and a second member correspondingly disposed and pivotedly connected to each other, the first and second members respectively comprising a blade portion and a handle portion; with blades of the blade portions of the first and second members provided in a concave shape, when the handle portions of the first and second members are relatively opened to the maximum extent, an initial trimming hole is formed between the concave blades of the first and second members, with the first and second members provided therebetween with an adjustment mechanism for adjusting the relative opening of the handle portions of the first and second members and the caliber of the initial trimming hole.

Preferably, the first and second members are provided therebetween with a reset mechanism for keeping the concave blades of the first and second members in the position of the initial trimming hole.

A further technical solution of the present invention is as follows: The adjustment mechanism comprises a turntable, a first screw located on the left side of the turntable and driven to rotate by the turntable, a second screw located on the right side of the turntable and driven to rotate by the turntable, a first limit block screwed on the first screw, and a second limit block screwed on the second screw, wherein the handle portions of the first and second members are provided oppositely with a first mounting slot and a second mounting slot, into which the first and second screws are inserted, with the threads on the two screws arranged in the reverse direction; the first and second limit blocks are respectively located in the first and second mounting slots and can move laterally relative to them, with notches of the first and second mounting slots smaller than the first and second limit blocks; when the turntable is rotated, it simultaneously drives the first and second screws to rotate, and the first and second limit blocks are moved axially close to or away from each other so as to adjust the distance between the first and second limit blocks, thus adjusting the relative opening of the handle portions of the first and second members and the caliber of the initial trimming hole.

The reset mechanism comprises a first spring and a second spring, wherein the first spring is sleeved on the first screw, with one end thereof abutting on the handle portion of the first member and the other end thereof abutting on the left side of the turntable, and the second spring is sleeved on the second screw, with one end thereof abutting on the handle portion of the second member and the other end thereof abutting on the right side of the turntable. Wherein the first and second springs are preferably conical springs, the larger ends thereof abutting on the handle portion of the first or second member, the smaller ends thereof abutting on the left or right side of the turntable. The reset mechanism may also be a reset member disposed between the handle portions of the first and second members. Wherein the reset member may be a spring or an elastic sheet.

Another further technical solution of the present invention is as follows: The adjustment mechanism comprises an adjustment sheet, which is rotatably connected to the first member and provided with multi-level tooth grooves; the second member is provided with a convex tooth portion matched with the tooth grooves; through engagement of the convex tooth portion of the second member with the different tooth grooves of the adjustment sheet, the relative opening of the handle portions of the first and second members and the caliber of the initial trimming hole are adjusted.

The reset mechanism is a reset member disposed between the handle portions of the first and second members. Wherein the reset member may be a spring or an elastic sheet.

Preferably, the handle portion of the first member is provided with a first limit lug and a first limit groove at a connection portion thereof for mounting the blade portion, and the handle portion of the second member is provided with a second limit lug and a second limit groove at a connection portion thereof for mounting the blade portion, wherein the first limit lug is embedded in the second limit groove and can slide relative to the same, and the second limit lug is embedded in the first limit groove and can slide relative to the same.

Preferably, the blade portion of the first member, provided with a screw hole, and the blade portion of the second member, provided with a through hole, are pivoted by a pivot mechanism, which comprises a pin, a nut and a corrugated gasket, with the pin passing through the inner hole of the gasket, the through hole and the screw hole to pivot the first and second members and get them tightened with the nut.

Preferably, a receiving groove, provided at the bottom of the handle portion of the first member or the second member, is provided inside with an abrasive rod capable of being pulled out relative to the same.

Preferably, the concave blade is a concave blade, a U-shaped blade or a V-shaped blade.

The present invention has the following advantages:

1. When the present invention is used, the caliber of the initial trimming hole can be adjusted and controlled within a certain range by an adjustment mechanism according to the size of a pet's nails, so as to prevent the pet from being hurt due to excessive trimming and thus be safer to use.

2. A receiving groove, provided at the bottom of the handle portion of the first or second member of the present invention, is provided inside with an abrasive rod capable of being pulled out relative to the same, so that after a pet's nails are trimmed, the abrasive rod can be pulled out to wear the nails to prevent the pet from hurting a person or damaging an item by scratching since the nails are trimmed too sharp.

BRIEF DESCRIPTION OF DRAWINGS

The present invention will be further described below with reference to drawings and examples.

LIST OF REFERENCE NUMBERS

1. A first member; 1-1. a first limit lug; 1-2. a first limit groove;
2. a second member;
3. a blade portion; 3-1. a blade; 3-2. a screw hole; 3-3. a through hole;
4. a handle portion;
5. an initial trimming hole;
6. an adjustment mechanism; 6-1. a turntable; 6-2. a first screw; 6-3. a second screw; 6-4. a first limit block; 6-5. a second limit block; 6-6. a first mounting slot; 6-7. a second mounting slot; 6-8. an adjustment sheet; 6-8-1. a tooth groove;
7. a reset mechanism; 7-1. a first spring; 7-2. a second spring; 7-3. a reset member;
8. a pivot mechanism; 8-1. a pin; 8-2. a nut; 8-3. a gasket;
9. a receiving groove;
10. an abrasive rod; and
11. a flexible handpiece.

DETAILED DESCRIPTION OF PREFERRED EMBODIMENTS

Example 1

As shown in FIGS. 1-9, a pair of safe pet nail clippers is provided, comprising a first member 1 and a second member 2 correspondingly disposed and pivotally connected to each other, the first and second members 1, 2 respectively comprising a blade portion 3 and a handle portion 4; with blades 3-1 of the blade portions 3 of the first and second members 1, 2 provided in a concave shape, when the handle portions 4 of the first and second members 1, 2 are relatively opened to the maximum extent, an initial trimming hole 5 is formed between the concave blades 3-1 of the first and second members 1, 2, with the first and second members 1, 2 provided therebetween with an adjustment mechanism 6 for adjusting the relative opening of the handle portions 4 of the first and second members 1, 2 and the caliber of the initial trimming hole 5.

In this example, a specific structure of the adjustment mechanism 6 is as follows: The adjustment mechanism 6 comprises a turntable 6-1, a first screw 6-2 located on the left side of the turntable 6-1 and driven to rotate by the turntable 6-1, a second screw 6-3 located on the right side of the turntable 6-1 and driven to rotate by the turntable 6-1, a first limit block 6-4 screwed on the first screw 6-2, and a second limit block 6-5 screwed on the second screw 6-3, wherein the handle portions 4 of the first and second members 1, 2 are provided oppositely with a first mounting slot 6-6 and a second mounting slot 6-7, into which the first and second screws 6-2, 6-3 are inserted, with the threads on the two screws 6-2, 6-3 arranged in the reverse direction; the first and second limit blocks 6-4, 6-5 are respectively located in the first and second mounting slots 6-6, 6-7 and can move laterally relative to them, with notches of the first and second mounting slots 6-6, 6-7 smaller than the first and second limit blocks 6-4, 6-5; in order to prevent the first and second limit blocks 6-4 6-5 from being off the first and second screws 6-2, 6-3 due to over rotation, the first and second screws 6-2, 6-3 can be provided at the outer end with a stopper.

When the turntable 6-1 is rotated, it simultaneously drives the first and second screws 6-2, 6-3 to rotate, and the first and second limit blocks 6-4, 6-5 move axially close to or away from each other, so as to adjust the distance between the first and second limit blocks 6-4, 6-5, thus adjusting the relative opening of the handle portions 4 of the first and second members 1, 2 and the caliber of the initial trimming hole 5.

In this example, the first and second members 1, 2 are provided therebetween with a reset mechanism 7 for keeping the concave blades 3-1 of the first and second members 1, 2 in the position of the initial trimming hole 5.

Figure 8:
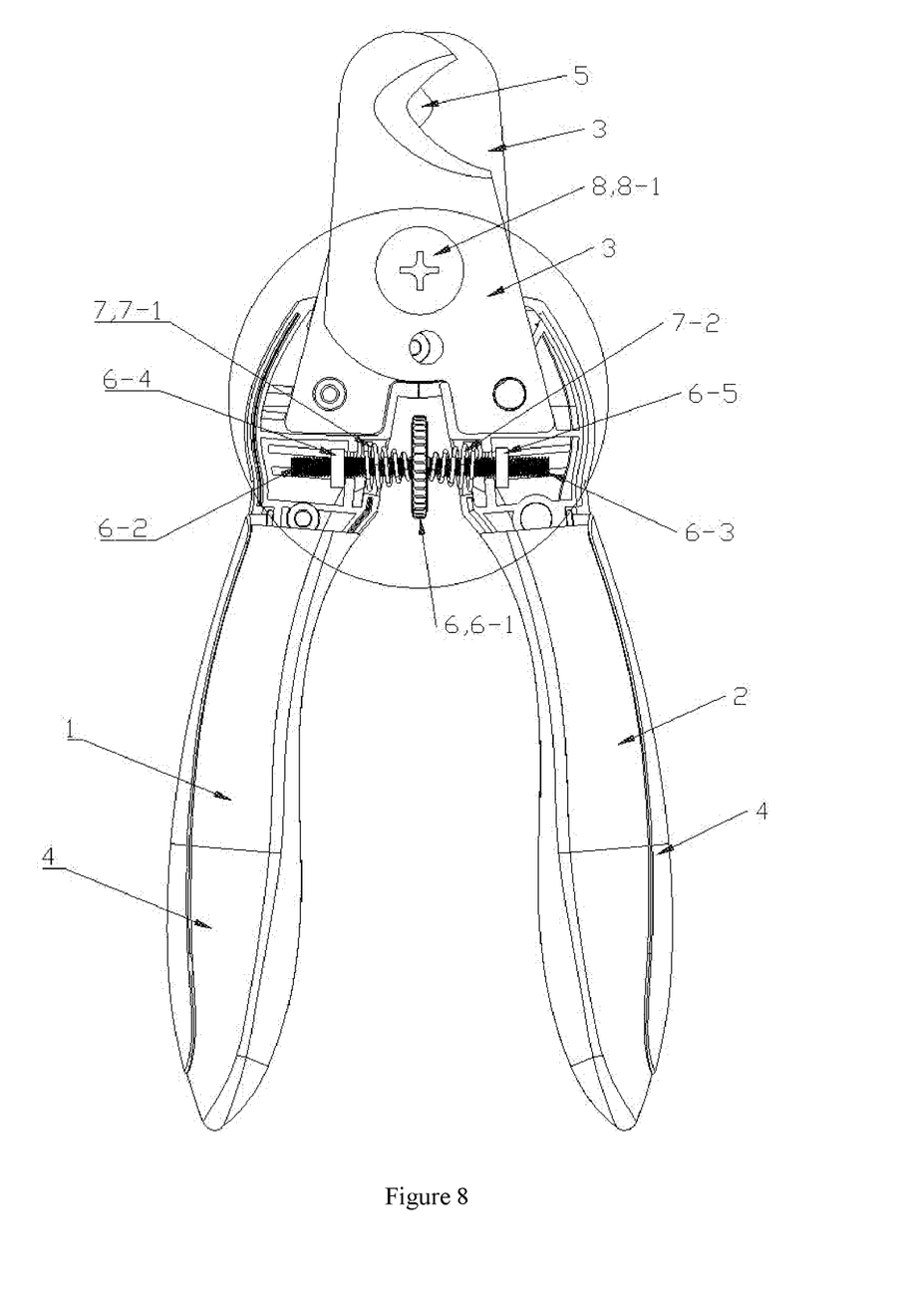
FIG. 8 is a schematic structural view of Example 1 of the present invention when the first and second springs are a conical spring.
Figure 9:
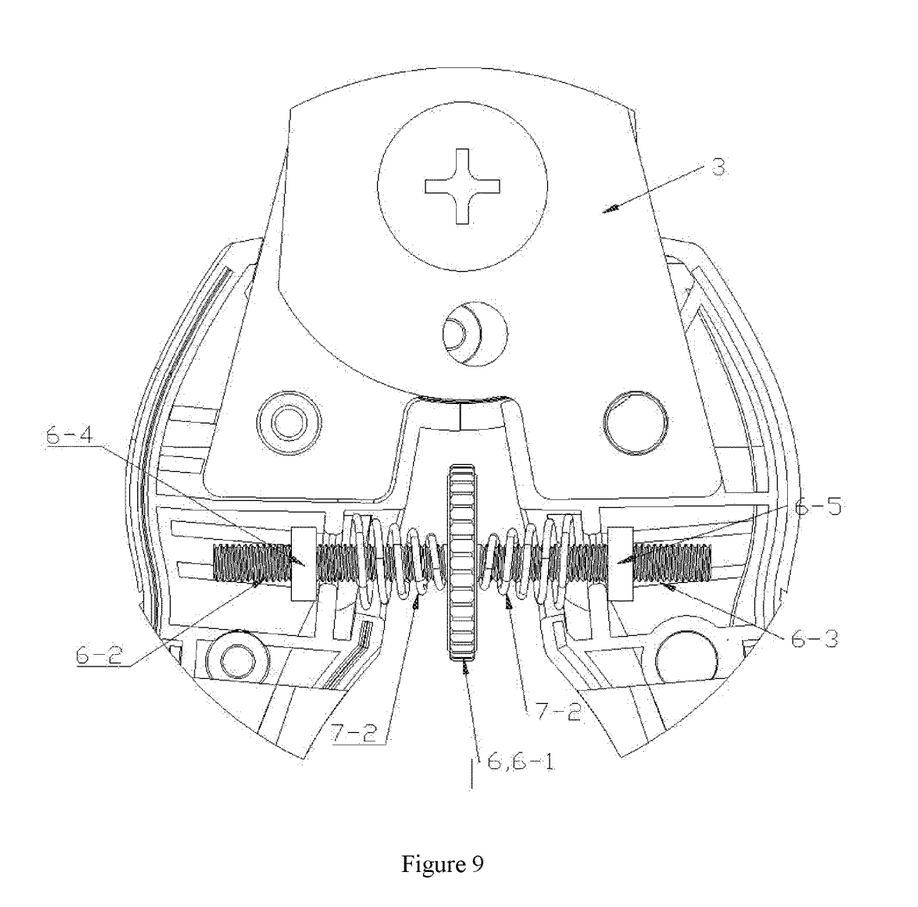
FIG. 9 is a schematic partial enlarged view of FIG. 8.
Figure 10:
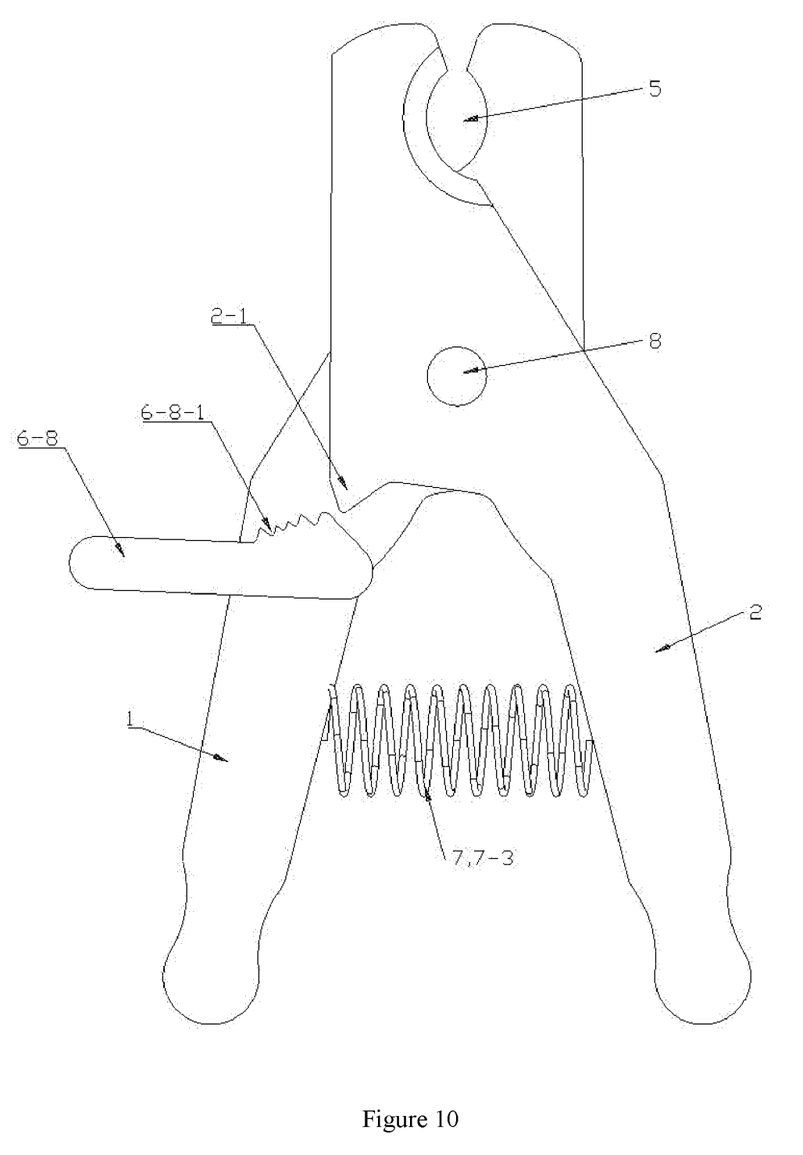
FIG. 10 is a schematic structural view of Example 2 of the present invention in the initial state.
Figure 11:
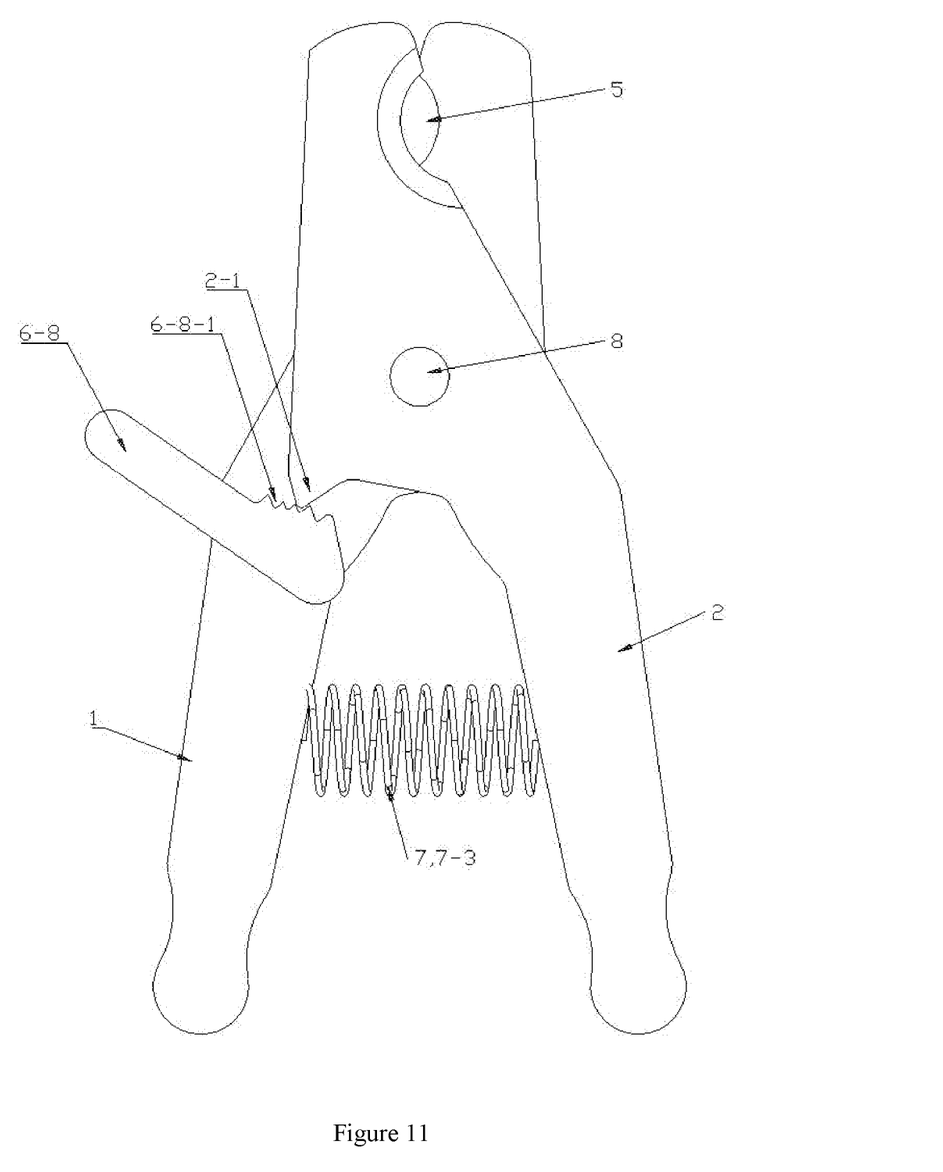
FIGS. 11 and 12 are schematic structural views of the adjustment sheet in FIG. 10 when in adjustment.
Figure 12:
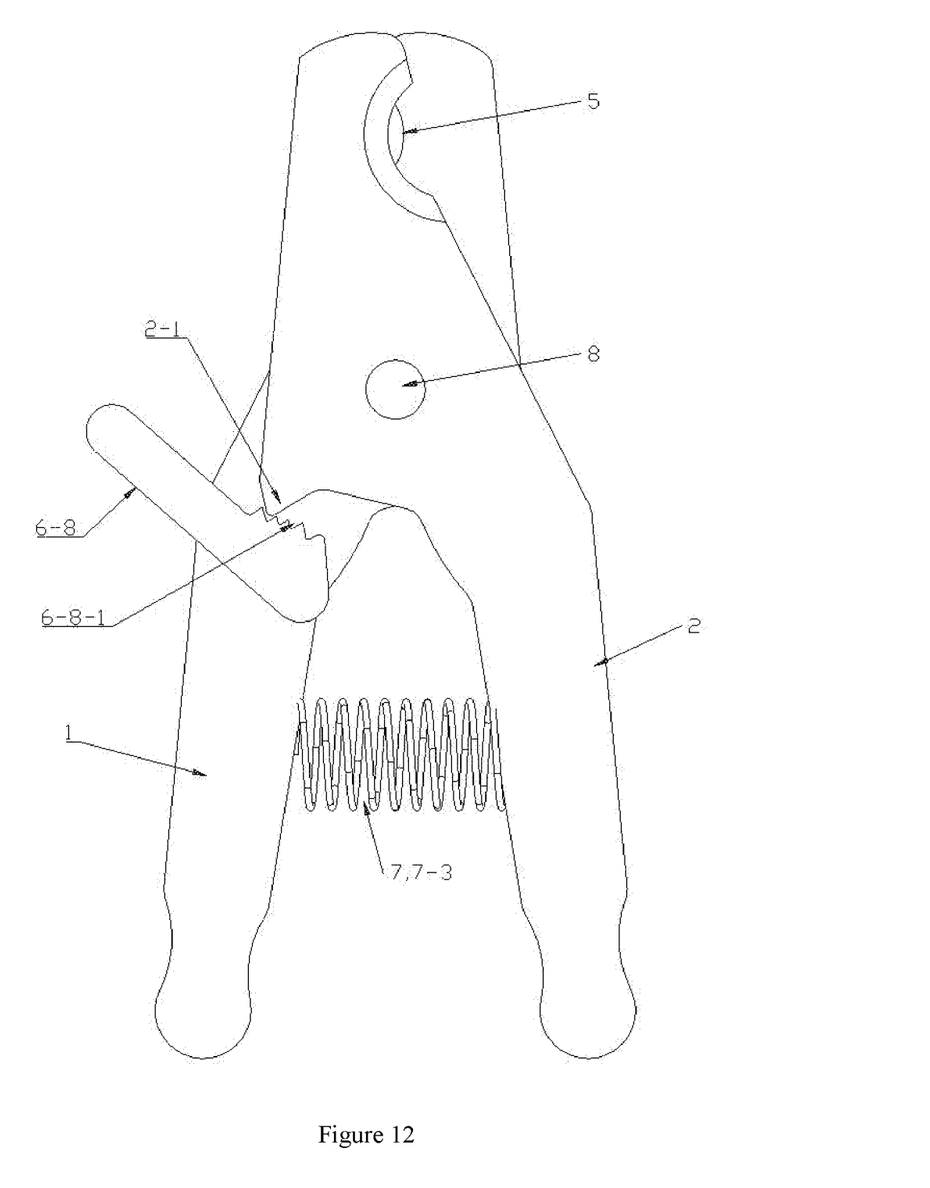
Figure 13:
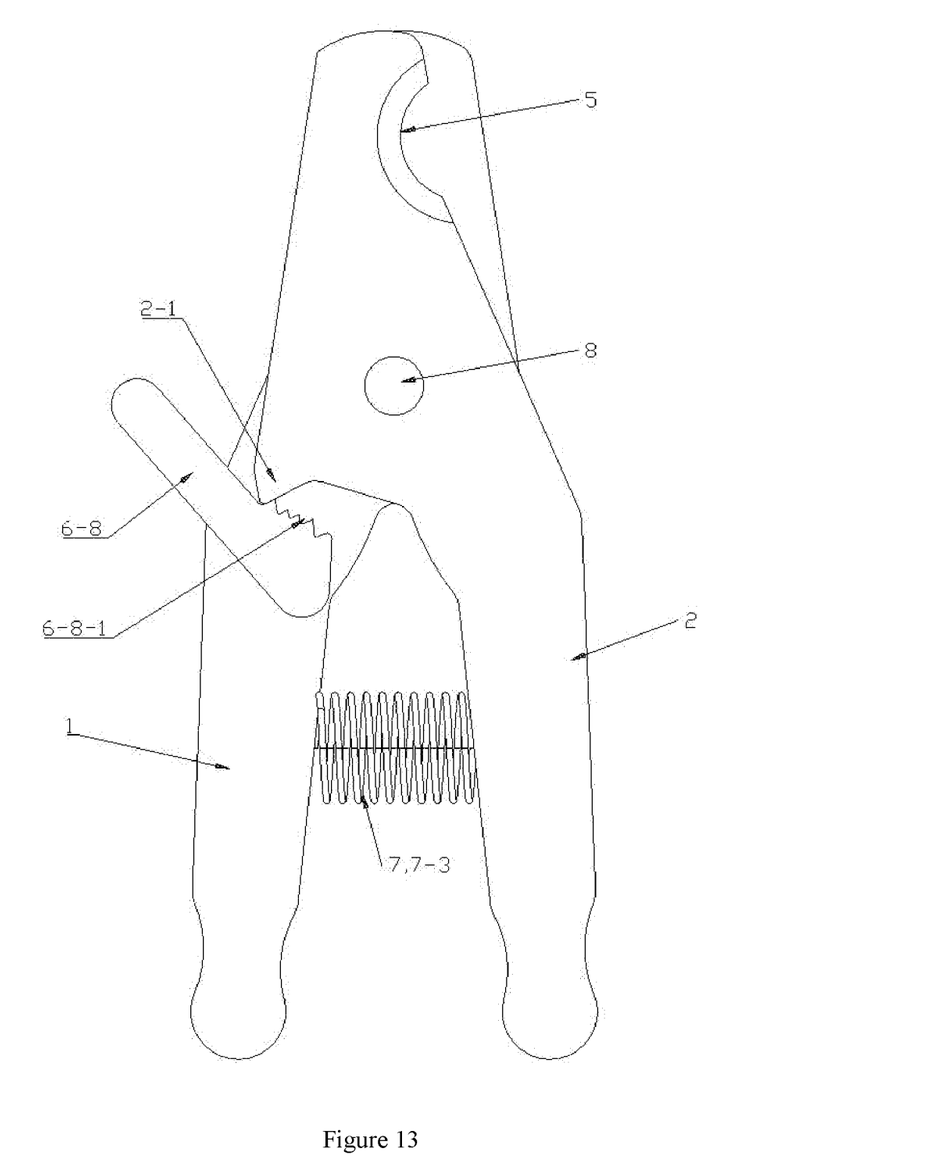
FIG. 13 is a schematic structural view of FIG. 10 when the blades are closed under an external force.

A specific structure of the reset mechanism 7 is as follows: The reset mechanism 7 comprises a first spring 7-1 and a second spring 7-2, wherein the first spring 7-1 is sleeved on the first screw 6-2, with one end thereof abutting on the handle portion 4 of the first member 1 and the other end thereof abutting on the left side of the turntable 6-1, and the second spring 7-2 is sleeved on the second screw 6-3, with one end thereof abutting on the handle portion 4 of the second member 2 and the other end thereof abutting on the right side of the turntable 6-1. Wherein the first and second springs 7-1, 7-2 are preferably conical springs, the larger ends thereof respectively abutting on the handle portions 4 of the first and second members 1, 2, the smaller ends thereof respectively abutting on the left and right sides of the turntable 6-1. This conical spring can greatly reduce the damping generated during its cooperation with rotation of the turntable.

Another specific structure of the reset mechanism 7 is as follows: The reset mechanism 7 is a reset member 7-3 disposed between the handle portions 4 of the first and second members 1, 2. The reset member 7-3 may be a spring or an elastic sheet.

Example 2

As shown in FIGS. 10-13, a pair of safe pet nail clippers is provided, comprising a first member 1 and a second member 2 correspondingly disposed and pivotally connected to each other, the first and second members 1, 2 respectively comprising a blade portion 3 and a handle portion 4; with blades 3-1 of the blade portions 3 of the first and second members 1, 2 provided in a concave shape, when the handle portions 4 of the first and second members 1, 2 are relatively opened to the maximum extent, an initial trimming hole 5 is formed between the concave blades 3-1 of the first and second members 1, 2, with the first and second members 1, 2 provided therebetween with an adjustment mechanism 6 for adjusting the relative opening of the handle portions 4 of the first and second members 1, 2 and the caliber of the initial trimming hole 5.

In this example, a specific structure of the adjustment mechanism 6 is as follows: The adjustment mechanism 6 comprises an adjustment sheet 6-8, which is rotatably connected to the first member 1 and provided with multi-level tooth grooves 6-8-1; the second member 2 is provided with a convex tooth portion 2-1 matched with the tooth grooves 6-8-1; through engagement of the convex tooth portion 2-1 of the second member 2 with the different tooth grooves 6-8-1 of the adjustment sheet 6-8, the relative opening of the handle portions 4 of the first and second members 1, 2 and the caliber of the initial trimming hole 5 are adjusted.

In this example, the first and second members 1, 2 are provided therebetween with a reset mechanism 7 for keeping the concave blades 3-1 of the first and second members 1, 2 in the position of the initial trimming hole 5.

In this example, a specific structure of the reset mechanism 7 is as follows: The reset mechanism 7 is a reset member 7-3 disposed between the handle portions 4 of the first and second members 1, 2. The reset member 7-3 may be a spring or an elastic sheet.

Figure 4:
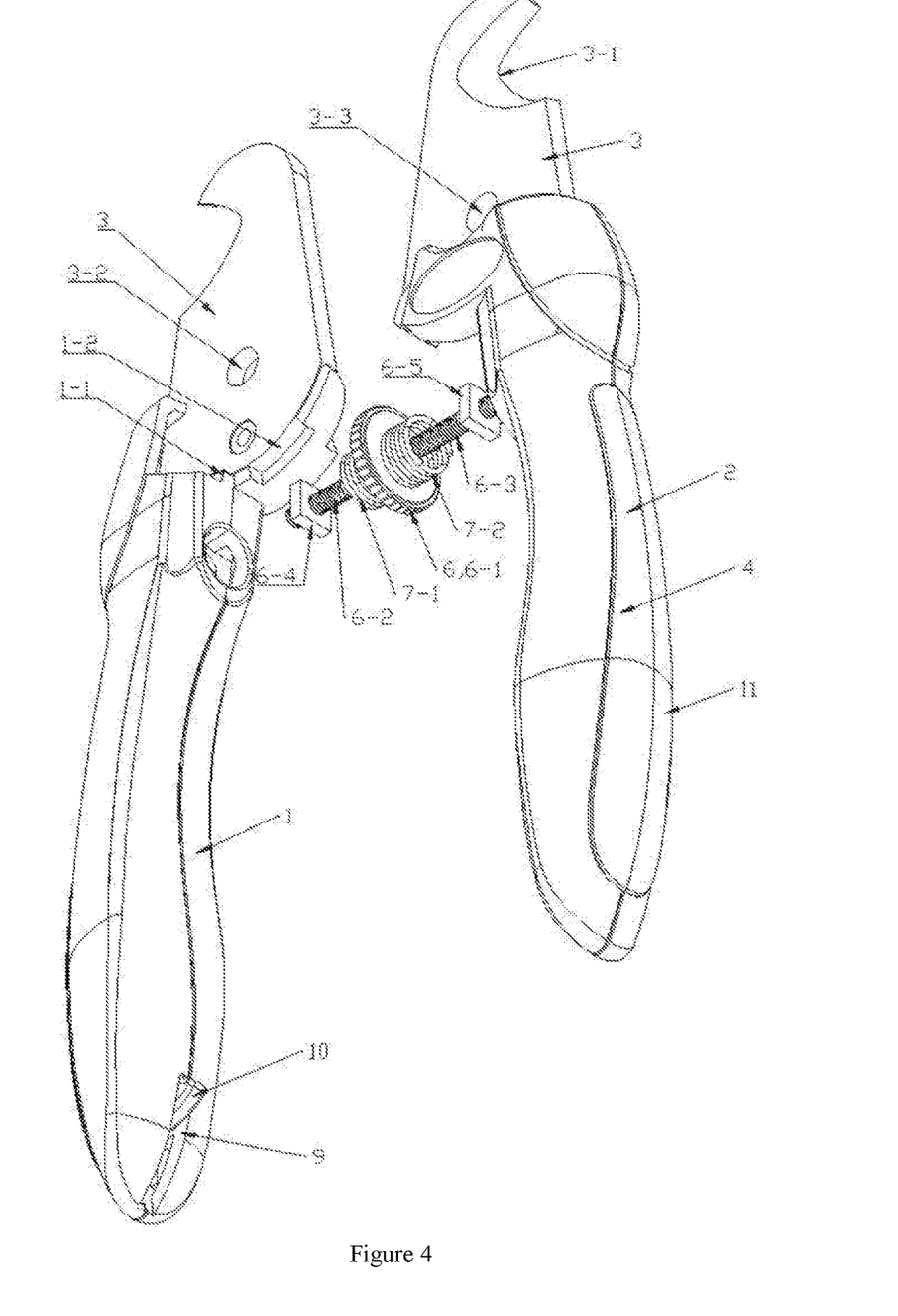
FIG. 4 is a schematic structural view of the assembly of FIG. 1.

In the above two examples, as shown in FIG. 4, the handle portion 4 of the first member 1 is provided with a first limit lug 1-1 and a first limit groove 1-2 at a connection portion thereof for mounting the blade portion 3, and the handle portion 4 of the second member 2 is provided with a second limit lug and a second limit groove at a connection portion thereof for mounting the blade portion 3, wherein the first limit lug 1-1 is embedded in the second limit groove and can slide relative to the same, and the second limit lug is embedded in the first limit groove 1-2 and can slide relative to the same.

Figure 5:
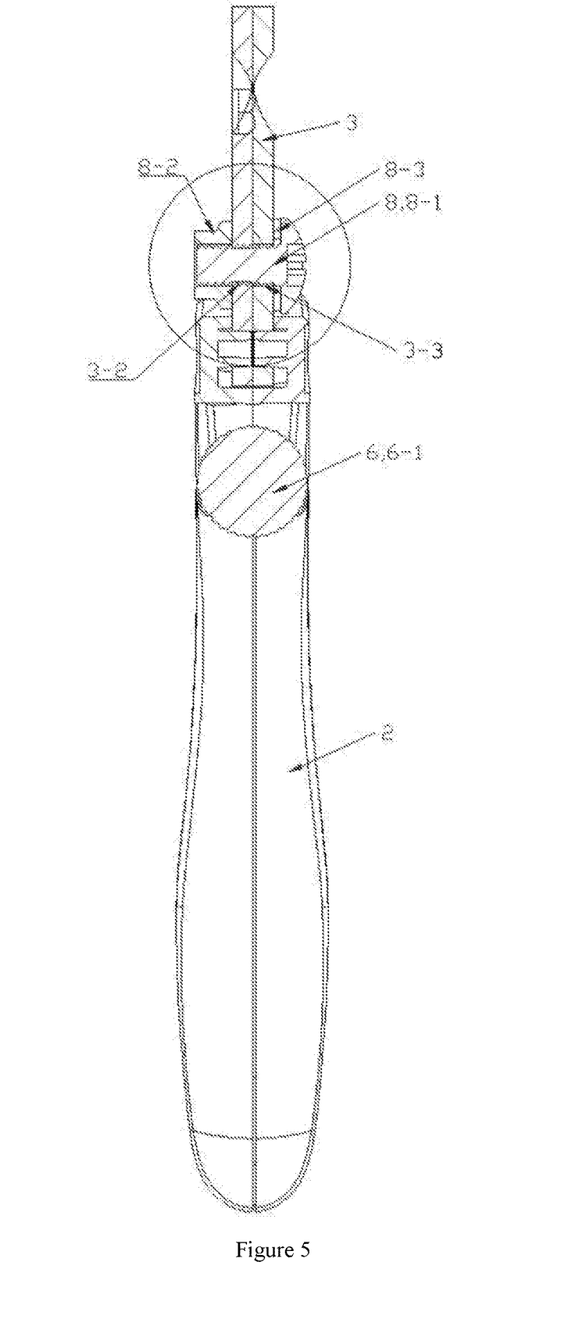
FIG. 5 is a schematic side view of the half-cut structure of FIG. 2.
Figure 6:
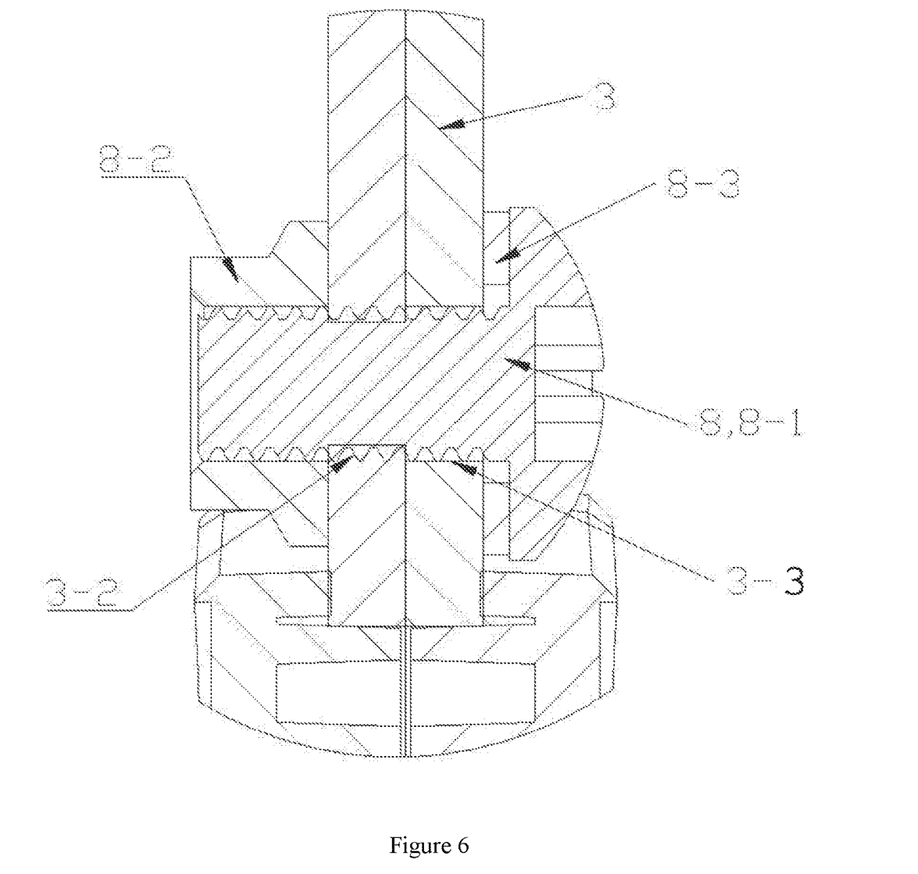
FIG. 6 is a schematic partial enlarged view of FIG. 5.
Figure 7:
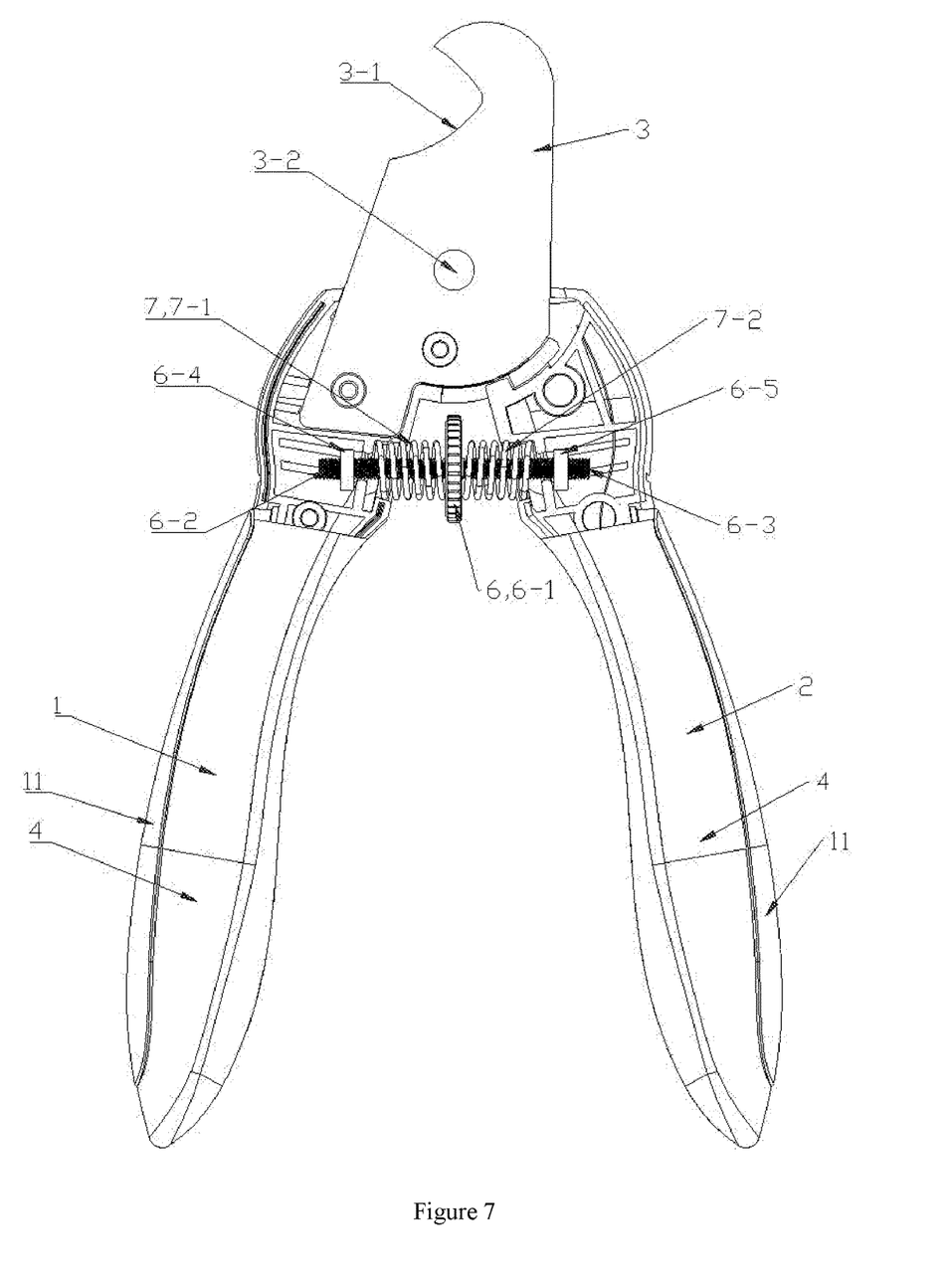
FIG. 7 is a schematic structural view of the front-and-rear partial assembly of FIG. 1.

In the above two examples, as shown in FIGS. 5 and 6, the blade portion 3 of the first member 1, provided with a screw hole 3-2, and the blade portion 3 of the second member 2, provided with a through hole 3-3, are pivoted by a pivot mechanism 8, which comprises a pin 8-1, a nut 8-2 and a corrugated gasket 8-3, with the pin 8-1 passing through the inner hole of the gasket 8-3, the through hole 3-3 and the screw hole 3-2 to pivot the first and second members 1, 2 and get them tightened with the nut 8-2. The above gasket 8-3 is arranged to make the blade portions 3 of the first and second members 1, 2 fit each other more tightly. The hole through which the bolt 8-1 is inserted is provided as the screw hole 3-2 on the blade portion 3 of the first member 1, so that the bolt 8-1 is respectively engaged with the screw hole 3-2 of the first member 1 and the nut 8-2, which makes the assembly more stable.

Figure 1:
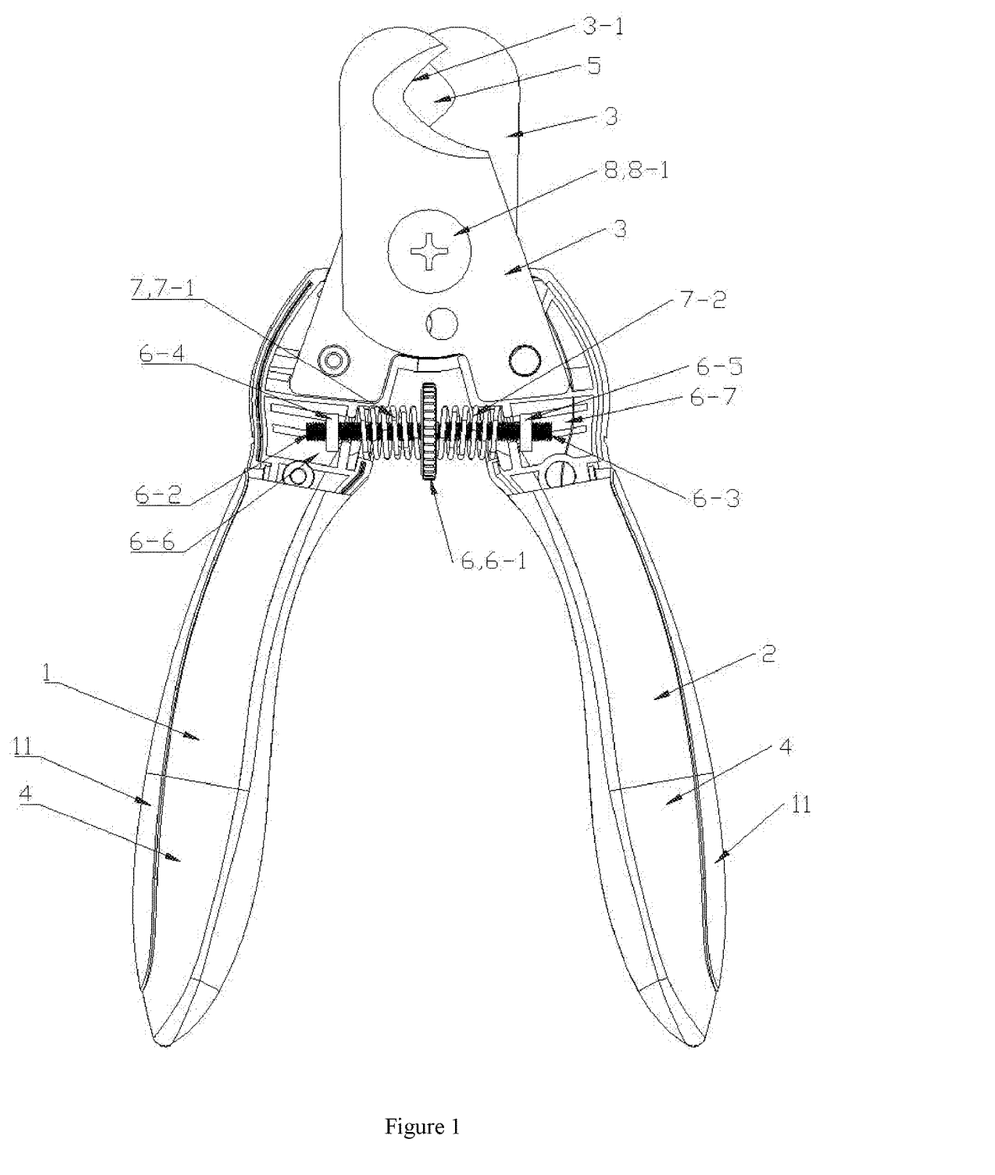
FIG. 1 is a schematic structural view of Example 1 of the present invention in the initial state.
Figure 2:
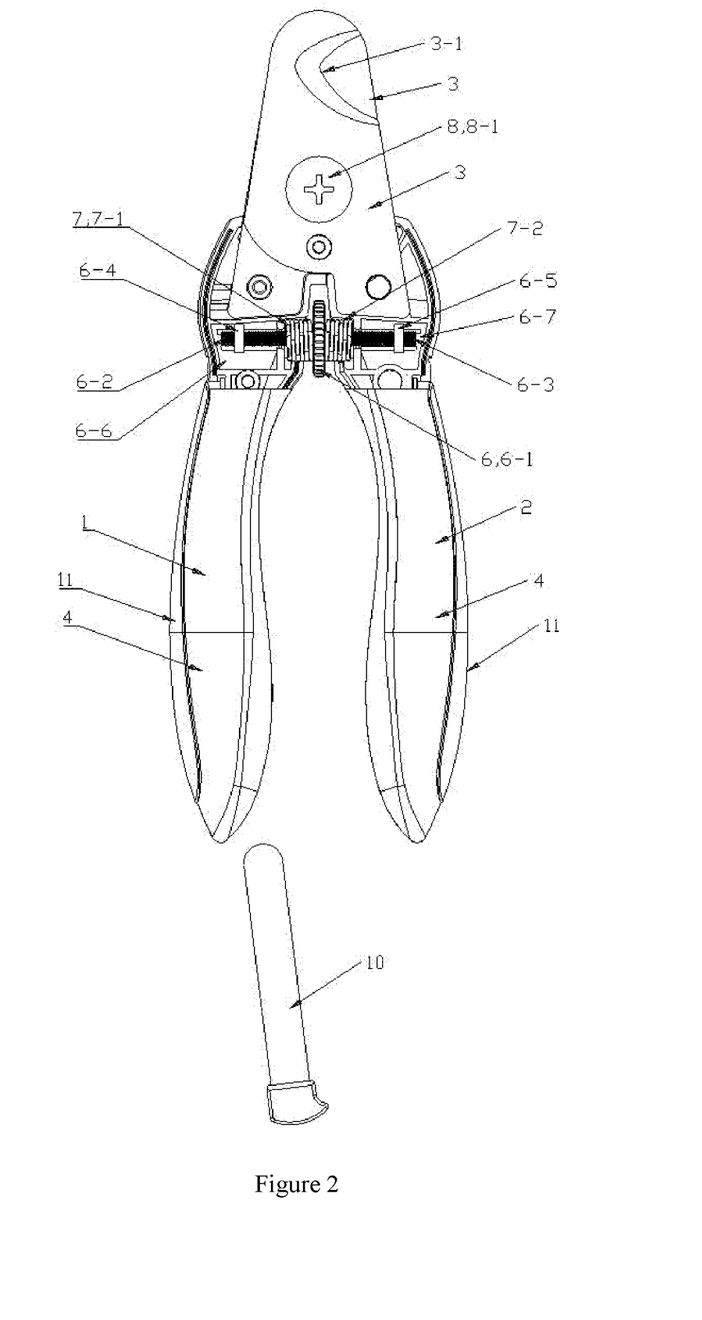
FIG. 2 is a schematic structural view of FIG. 1 when the blades are closed under an external force.
Figure 3:
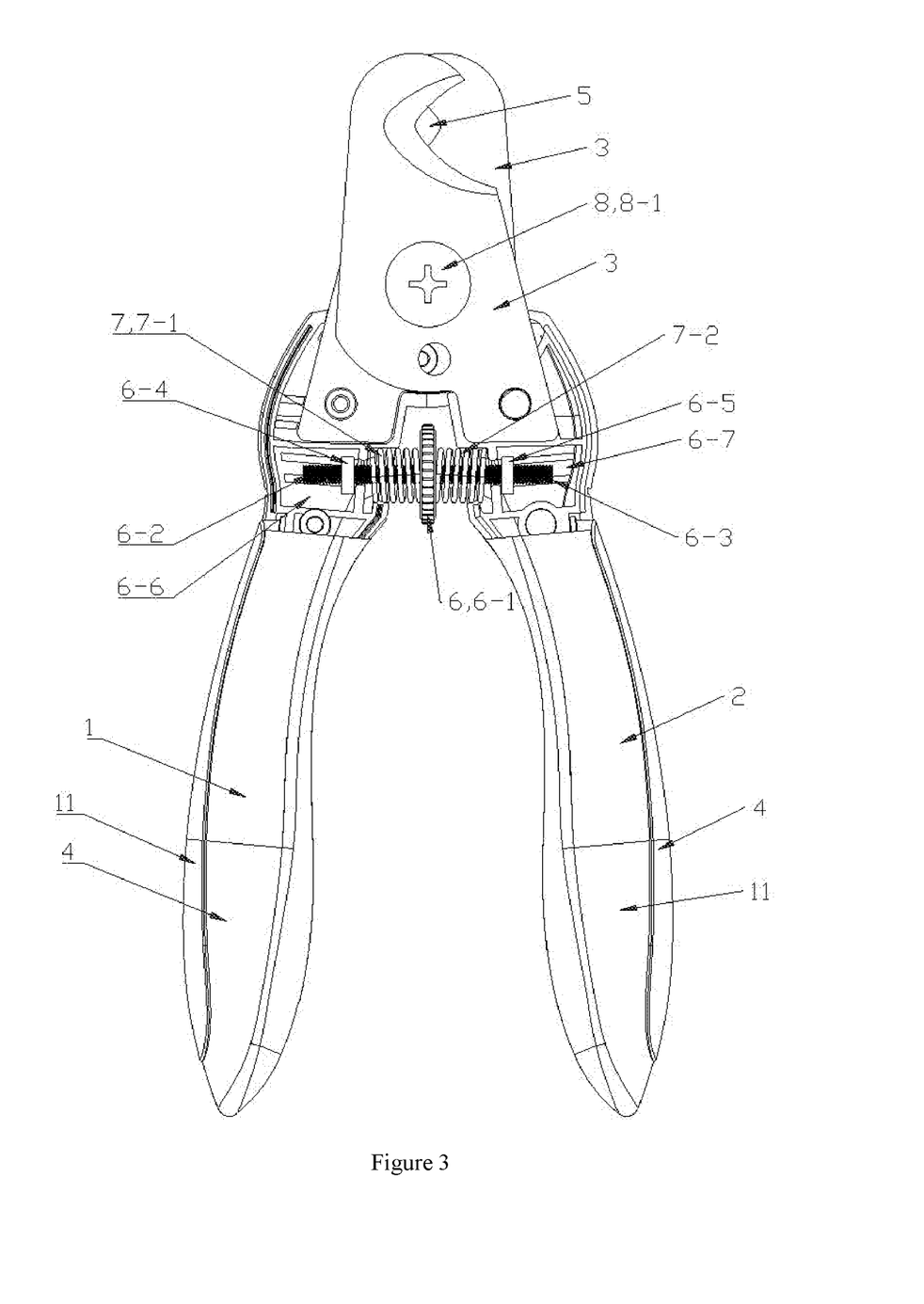
FIG. 3 is a schematic structural view of FIG. 1 after the turntable is rotated for adjustment.

In the above two examples, as shown in FIGS. 2 and 4, a receiving groove 9, provided at the bottom of the handle portion 4 of the first member 1 or the second member 2, is provided inside with an abrasive rod 10 capable of being pulled out relative to the same, so that after a pet's nails are trimmed, the abrasive rod can be pulled out to wear the nails to prevent the pet from hurting a person or damaging an item by scratching since the nails are trimmed too sharp.

In the above two examples, the concave blade 3-1 is a concave blade, a U-shaped blade or a V-shaped blade.

In the above two examples, as shown in FIGS. 1-8, in order to improve the hand-held comfort of the pair of nail clippers, an elastic handpiece 11 is disposed on the outer sidewall of the handles 4 of the first and second members 1, 2.

When the present invention is used, the caliber of the initial trimming hole can be adjusted and controlled within a certain range by an adjustment mechanism according to the size of a pet's nails, so as to prevent the pet from being hurt due to excessive trimming and thus be safer to use.

What is mentioned above is only an embodiment of the present invention, and cannot limit the scope of protection of the present invention. In addition to the above examples, the present invention can also have other embodiments. Any technical solution based on equal substitution or equivalent alteration all falls within the scope of protection claimed by the present invention.

What is claimed is:

1. A pair of safe pet nail clippers, comprising a first member (1) and a second member (2) correspondingly disposed and pivotally connected to each other by a pivot mechanism (8), the first and second members (1, 2) respectively comprising a blade portion (3) and a handle portion (4), characterized in that: with blades (3-1) of the blade portions (3) of the first and second members (1, 2) provided in a concave shape, when the handle portions (4) of the first and second members (1, 2) are relatively opened by the pivot mechanism (8), an initial trimming hole (5) is formed between the concave blades (3-1) of the first and second members (1, 2), with the first and second members (1, 2) provided therebetween with an adjustment mechanism (6) for adjusting the relative opening of the handle portions (4) of the first and second members (1, 2) and a caliber of the initial trimming hole (5), wherein the first and second members (1, 2) are provided therebetween with a reset mechanism (7) for keeping the concave blades (3-1) of the first and second members (1, 2) in the position of the initial trimming hole (5), and the reset mechanism (7) comprises a first spring (7-1) and a second spring (7-2), wherein the first spring (7-1) is sleeved on the first screw (6-2), with one end thereof abutting on the handle portion (4) of the first member (1) and the other end thereof abutting on a first side of the turntable (6-1), and the second spring (7-2) is sleeved on the second screw (6-3), with one end thereof abutting on the handle portion (4) of the second member (2) and the other end thereof abutting on a second side of the turntable (6-1); and wherein the adjustment mechanism (6) comprises a turntable (6-1), a first screw (6-2) located on the first side of the turntable (6-1) and driven to rotate by the turntable (6-1), a second screw (6-3) located on the second side of the turntable (6-1) and driven to rotate by the turntable (6-1), a first limit block (6-4) screwed on the first screw (6-2), and a second limit block (6-5) screwed on the second screw (6-3), wherein the handle portions (4) of the first and second members (1, 2) are provided oppositely with a first mounting slot (6-6) and a second mounting slot (6-7), respectively, into which the first and second screws (6-2, 6-3) are inserted, with the threads on the two screws (6-2, 6-3) arranged in the reverse direction; the first and second limit blocks (6-4, 6-5) are respectively located in the first and second mounting slots (6-6, 6-7) and can move laterally relative to them, with notches of the first and second mounting slots (6-6, 6-7) smaller than the first and second limit blocks (6-4, 6-5); when the turntable (6-1) is rotated, the turntable (6-1) simultaneously drives the first and second screws (6-2, 6-3) to rotate, and the first and second limit blocks (6-4, 6-5) are moved axially close to or away from each other so as to adjust the distance between the first and second limit blocks (6-4, 6-5), thus adjusting the relative opening of the handle portions (4) of the first and second members (1, 2) and the caliber of the initial trimming hole (5).

2. The pair of safe pet nail clippers according to claim 1, characterized in that: the first and second springs (7-1, 7-2) are conical springs, the larger ends thereof respectively abutting on the handle portions (4) of the first and second members (1, 2), the smaller ends thereof respectively abutting on the first and second sides of the turntable (6-1).

3. The pair of safe pet nail clippers according to claim 1, characterized in that: the handle portion (4) of the first member (1) is provided with a first limit lug (1-1) and a first limit groove (1-2) for mounting the blade portion (3), and the handle portion (4) of the second member (2) is provided with a second limit lug and a second limit groove for mounting the blade portion (3), wherein the first limit lug (1-1) is embedded in the second limit groove and can slide relative to the second limit groove, and the second limit lug is embedded in the first limit groove (1-2) and can slide relative to the first limit groove.

4. The pair of safe pet nail clippers according to claim 1, characterized in that: the blade portion (3) of the first member (1), provided with a screw hole (3-2), and the blade portion (3) of the second member (2), provided with a through hole (3-3), are pivoted by the pivot mechanism (8), which comprises a pin (8-1), a nut (8-2) and a corrugated gasket (8-3), with the pin (8-1) passing through the inner hole of the gasket (8-3), the through hole (3-3) and the screw hole (3-2) to pivot the first and second members (1, 2) and get them tightened with the nut (8-2).

5. The pair of safe pet nail clippers according to claim 1, characterized in that: a receiving groove (9), provided at a bottom of the handle portion (4) of the first member (1) or the second member (2), is provided inside with an abrasive rod (10) capable of being pulled out relative to the receiving groove (9).

* * * * *